United States Patent
Noble et al.

(10) Patent No.: US 10,909,721 B2
(45) Date of Patent: Feb. 2, 2021

(54) SYSTEMS AND METHODS FOR IDENTIFYING POSE OF CAMERAS IN A SCENE

(71) Applicant: SEEING MACHINES LIMITED, Fyshwick (AU)

(72) Inventors: John Noble, Braddon (AU); Timothy James Henry Edwards, Kallista (AU)

(73) Assignee: SEEING MACHINES LIMITED, Fyshwick (AU)

( * ) Notice: Subject to any disclaimer, the term of this patent is extended or adjusted under 35 U.S.C. 154(b) by 0 days.

(21) Appl. No.: 16/311,471

(22) PCT Filed: Jun. 29, 2017

(86) PCT No.: PCT/AU2017/050667
§ 371 (c)(1),
(2) Date: Dec. 19, 2018

(87) PCT Pub. No.: WO2018/000037
PCT Pub. Date: Jan. 4, 2018

(65) Prior Publication Data
US 2019/0206084 A1    Jul. 4, 2019

(30) Foreign Application Priority Data

Jun. 29, 2016    (AU) ................................ 2016902547

(51) Int. Cl.
*G06T 7/73*    (2017.01)
*G06K 9/00*    (2006.01)
(Continued)

(52) U.S. Cl.
CPC ............ *G06T 7/74* (2017.01); *G06K 9/00228* (2013.01); *G06K 9/00604* (2013.01);
(Continued)

(58) Field of Classification Search
CPC ......... G05D 1/0088; G05D 2201/0213; G05D 1/0278; G05D 1/0231; G05D 1/0061
See application file for complete search history.

(56) References Cited

U.S. PATENT DOCUMENTS 6,025,790 A * 2/2000 Saneyoshi ............ G05D 1/0251
340/946
6,537,114 B2 * 3/2003 Evans .................... A63B 31/11
440/64
(Continued)

FOREIGN PATENT DOCUMENTS

WO    2014152254    9/2014

*Primary Examiner* — Yosef Kassa
(74) *Attorney, Agent, or Firm* — Jason P. Mueller; FisherBroyles, LLP

(57) ABSTRACT

Described herein are systems and methods of determining a pose of a camera within a vehicle scene. In one embodiment, a method includes the initial step of capturing an image of the vehicle scene from the camera. At step, reference data indicative of the vehicle scene is loaded, the reference data includes positions and orientations of known features within the vehicle scene. Next, at step, the geometric appearance of one or more of the known features is identified within the image. Finally, at step, the three dimensional position and orientation of the camera relative to the known features identified in step c) is determined from the geometric appearance, and a pose of the camera within the vehicle scene is calculated.

20 Claims, 11 Drawing Sheets

(51) Int. Cl.
  *H04N 5/247* (2006.01)
  *G06T 7/80* (2017.01)
  *G06T 7/60* (2017.01)

(52) U.S. Cl.
  CPC ............ *G06K 9/00845* (2013.01); *G06T 7/60* (2013.01); *G06T 7/73* (2017.01); *G06T 7/80* (2017.01); *H04N 5/247* (2013.01); *G06T 2207/20081* (2013.01); *G06T 2207/30201* (2013.01); *G06T 2207/30244* (2013.01); *G06T 2207/30252* (2013.01); *G06T 2207/30256* (2013.01); *G06T 2207/30268* (2013.01)

(56) References Cited

U.S. PATENT DOCUMENTS

| | | | | |
|---|---|---|---|---|
| 7,224,309 B2* | 5/2007 | Shimomura | .......... | G01S 13/931 342/70 |
| 7,447,573 B2* | 11/2008 | Hiwatashi | ............. | G01C 21/26 340/988 |
| 7,617,037 B2* | 11/2009 | Desens | ................ | B62D 15/026 701/96 |
| 7,765,066 B2* | 7/2010 | Braeuchle | .......... | B60W 30/095 701/301 |
| 8,059,887 B2* | 11/2011 | Fields | .................... | G06K 9/209 382/112 |
| 8,392,064 B2* | 3/2013 | Thrun | .................. | B62D 15/025 701/41 |
| 8,478,493 B2* | 7/2013 | Anderson | .............. | G05D 1/024 37/348 |
| 8,604,932 B2 | 12/2013 | Breed et al. | | |
| 8,880,272 B1* | 11/2014 | Ferguson | ............... | B60W 10/20 701/26 |
| 9,117,272 B2* | 8/2015 | Klebanov | ............. | B60Q 1/115 |
| 9,170,332 B2* | 10/2015 | Shimizu | ................ | B60Q 5/006 |
| 2005/0237385 A1 | 10/2005 | Kosaka et al. | | |
| 2009/0261979 A1 | 10/2009 | Breed et al. | | |
| 2009/0295921 A1 | 12/2009 | Fujita | | |
| 2011/0221599 A1 | 9/2011 | Hogasten | | |
| 2014/0270476 A1 | 9/2014 | Cameron et al. | | |
| 2014/0347486 A1 | 11/2014 | Okouneva | | |
| 2016/0049020 A1 | 2/2016 | Kuehnle et al. | | |

* cited by examiner

SYSTEMS AND METHODS FOR IDENTIFYING POSE OF CAMERAS IN A SCENE

CROSS-REFERENCE TO RELATED APPLICATIONS

This application is a national stage entry under 35 U.S.C. 371 of PCT Patent Application No. PCT/AU2017/050667, filed Jun. 29, 2017, which claims priority to Australian Patent Application No. 2016902547, filed Jun. 29, 2016, the entire contents of which is incorporated herein by reference.

FIELD OF THE INVENTION

The present disclosure relates to camera monitoring systems and in particular to systems and methods for determining a pose of a camera in a scene. Embodiments of the disclosure have been particularly developed for determining camera pose of one or more cameras in driver monitoring systems used in vehicles. While some embodiments are described herein with particular reference to that application, the disclosure is not limited to such a field of use, and is applicable in broader contexts.

BACKGROUND

Any discussion of the background art throughout the specification should in no way be considered as an admission that such art is widely known or forms part of common general knowledge in the field.

Cameras in vehicle monitoring systems are required to be installed with a high degree of accuracy in terms of both position and orientation for the system to function properly. Tracking the location of people within the vehicle, in particular their gaze direction (origin and orientation), typically requires registration of the gaze direction to the vehicle to within <1.5 degrees of accuracy. For example, the relationship between the icons on a heads-up display on the windscreen and the driver's gaze will need accuracy of gaze relative to the windscreen of about this amount. If the camera is mounted in the instrument cluster, and there is a 1.5 degree error in the pitch of that camera, which is typical, then the system will not be able to detect if the driver is looking at an icon on the heads-up-display. The gaze vector must ultimately be calculated in a coordinate system tied to the vehicle frame of reference. However, initially the gaze vector is calculated in the camera frame of reference and must subsequently be transformed to the vehicle coordinate system. Thus, accurate gaze direction cannot be achieved without accurately knowing the pose of the camera to the vehicle. In particular, the camera pitch, yaw and roll are the variables that are most sensitive to error, as small errors in these create large errors in gaze direction.

The cameras are typically mounted to a surface or object by a fixed or adjustable mount. The inventors have identified that, during operation of the monitoring systems, particularly in vehicles, invariably the orientation of one or more cameras in their respective mounts shifts out of alignment and recalibration is required. This misalignment is more likely to occur in systems in motion such as vehicles and particularly in mining vehicles which are often impacted by rocks and other moving objects. Another example is when the camera is mounted on the steering column or steering wheel, the steering column may be a moving part creating a large uncertainty in the camera orientation. Vehicle cabins also change their shape slightly when forces are applied to them (e.g. parked on a curb), leading to the problem of continuous online calibration of the camera relative to the vehicle being required.

The recalibration process takes time and results in system downtime and the accuracy of the positions/orientations of the cameras are limited by the competence of the technician reorienting the cameras. Furthermore, until the misalignment is identified, the system may operate with the cameras out of alignment, which manifests as inaccurate projections between cameras and inaccurate tracking of objects between the respective camera fields of view.

SUMMARY

A method of determining a pose of a camera within a vehicle scene, is described. The method includes:
a) capturing an image of the vehicle scene from the camera;
b) loading reference data indicative of the vehicle scene, the reference data including positions and orientations of known features within the vehicle scene;
c) identifying, within the image, the geometric appearance of one or more of the known features;
d) determining, from the geometric appearance, the three dimensional position and orientation of the camera relative to the known features identified in step c) and calculating a pose of the camera within the vehicle scene.

In some embodiments, the known features include a vehicle cabin. In other embodiments, the known features include definable cabin contours, edges, or objects within a vehicle cabin. In further embodiments, the known features include vehicle dashboard instruments.

In some embodiments, the reference data includes a three dimensional model of the vehicle scene.

In some embodiments step c) includes performing an image matching technique to determine the two dimensional location of the known features in the image.

In some embodiments step d) includes fitting the image onto the three dimensional model using a minimization of the location of the known features in the image with corresponding features in the model. Step d) may include minimizing the error between the feature locations in the image and the corresponding feature locations within the model as the model is varied to simulate different fixed camera poses. The minimizing may be performed by comparing two dimensional feature locations in the image with two dimensional feature locations in the model. The feature locations in the image may be projected into three dimensional coordinates and the minimizing is performed by comparing the three dimensional feature locations in the image and three dimensional locations in the model.

Varying the model may include rotating the model in one or more rotational dimensions. Varying the model may also include translating the model in one or more linear dimensions.

In some embodiments, the reference data includes a two dimensional image of the vehicle scene captured at an earlier time and at a known camera pose.

In some embodiments step d) includes performing an error minimization to align the known features in the current image with the corresponding features in the earlier image and extracting the camera pose from the required alignment. In some embodiments step d) includes applying rules learned by a machine learning process to the geometric appearance of one or more of the known.

In some embodiments, the reference data includes camera orientation data received from an orientation sensor mounted to the camera. The orientation data may be compared to second orientation data received from an orientation sensor mounted to the vehicle frame.

A further embodiment includes a method of determining a pose of a camera positioned to image a vehicle scene, the camera having an orientation sensor for measuring the orientation of the camera, the method including:
 a) receiving input specifying an initial reference pose of the camera including a reference position and reference orientation of the camera relative to a frame of reference within the scene;
 b) receiving, from the orientation sensor, an orientation signal indicative of a current orientation of the camera in at least one dimension relative to the reference orientation;
 c) comparing the current orientation of the camera with its associated reference orientation and determining an orientation error based on the comparison; and
 d) based on the orientation error, updating a current orientation of the camera and determining a new camera pose.

In some embodiments, the camera includes an actuator adapted to selectively adjust the orientation of the camera based on the error signal In some embodiments, the camera is maintained within an adjustable mount and the actuator is operatively associated with the adjustable mount to selectively adjust the orientation of the camera by varying the adjustable mount.

The orientation signal may include an orientation of a camera in two or three dimensions.

In one embodiment, the orientation sensor includes an accelerometer. In another embodiment, the orientation sensor includes a gyroscope. In a further embodiment, the orientation sensor includes a magnetometer. In a still further embodiment the orientation sensor includes an inertial measurement unit.

In some embodiments, the reference orientation is defined by the geometry of the vehicle cabin.

In some embodiments, the method includes the step of receiving velocity or acceleration data of the vehicle. The method may also include the step of receiving GPS data for a predefined position within the scene.

A further embodiment includes a system for determining a pose of a camera positioned to image a vehicle scene, the system including:
 a camera mounted at a known position within or adjacent the vehicle scene;
 an orientation sensor mounted to the camera and adapted to generate an orientation signal indicative of an orientation of the camera in at least one dimension relative to a reference orientation;
 a processor operatively associated with the orientation sensor and configured to:
 receive the orientation signal;
 compare the orientation of the camera with an initial reference orientation of the camera relative to a frame of reference within the scene and determine an orientation error based on the comparison; and
 based on the orientation error, update a current orientation of the camera and determine a new camera pose.

In some embodiments, the system includes an actuator operatively associated with the camera and responsive to the orientation signal to selectively adjust the orientation of the camera by varying the state of the actuator.

A further embodiment includes a method of training a neural network to recognise camera pose within a scene, the method including:
 a) rendering a two dimensional image of the scene from a three dimensional model of the scene when viewed from a predetermined observation reference point;
 b) performing image analysis on the rendered image to learn details of the geometric appearance of known features in the rendered image;
 c) associating the learned details of the geometric appearance of the known features are associated with a camera pose defined by the current observation reference point;
 d) adjusting the observation reference point and repeating steps a) to c) a predetermined number of times; and
 e) learning rules or patterns associating the camera pose and geometric appearance of the reference features within the scene as viewed from different observation reference points.

BRIEF DESCRIPTION OF THE DRAWINGS

Embodiments of the disclosure are described below, by way of example only, with reference to the accompanying drawings in which.

DETAILED DESCRIPTION

System Overview

The embodiments of the present disclosure described herein relate to automating the calibration of camera pose of cameras in a multi-camera vehicle monitoring system. In these embodiments, the scene to be imaged includes a driver of a vehicle, the interior of the vehicle/cockpit, the forward road scene of the vehicle and optionally side and rear views from the vehicle. The vehicle may represent a commercial automobile, truck, earthmoving machine, airplane, jet or helicopter. However, it will be appreciated that the disclosure is applicable to other monitoring systems such as surveillance networks for monitoring other scenes. Further, the disclosure is also applicable to single camera monitoring systems also.

Figure 1:
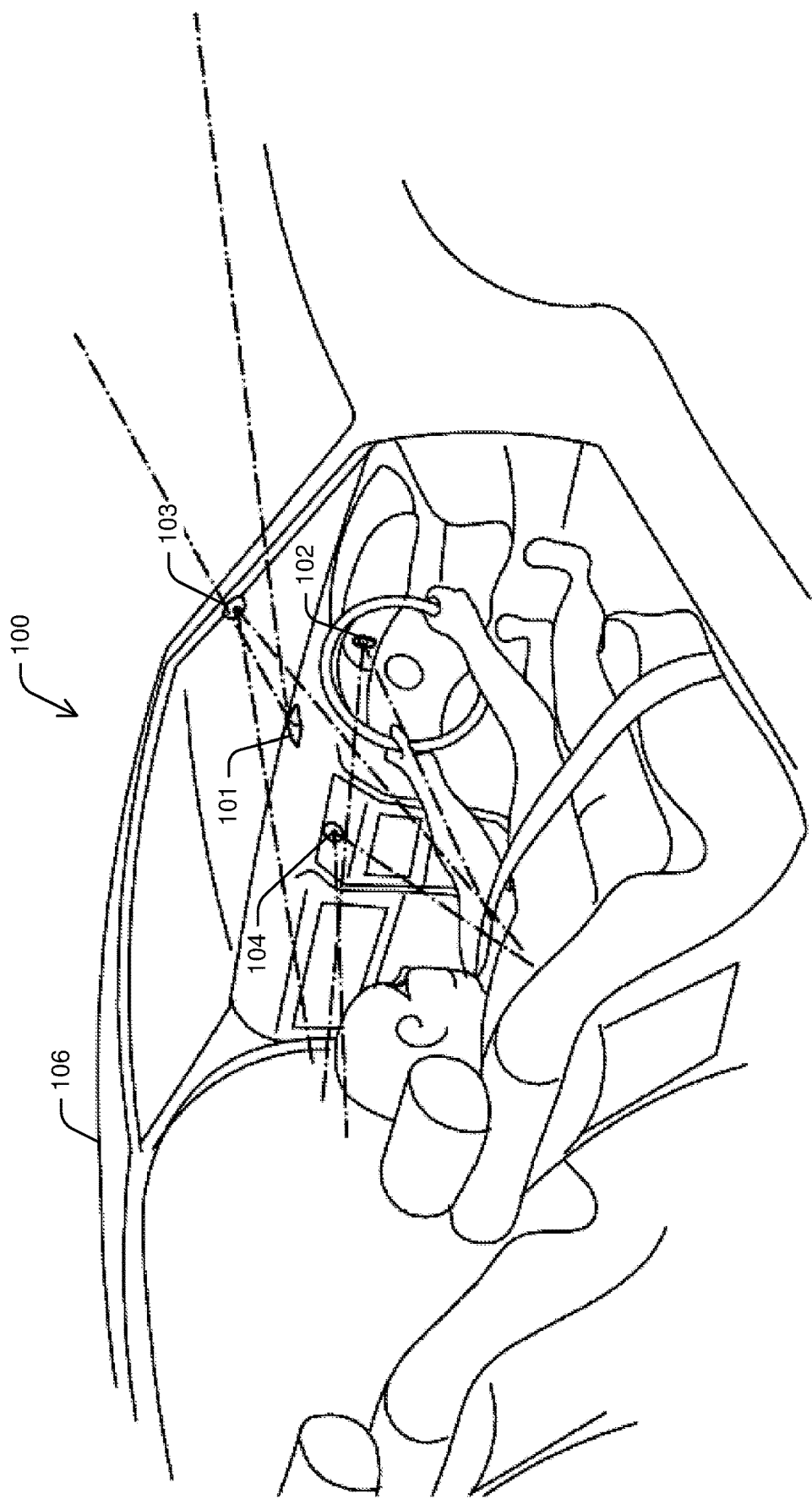
FIG. 1 is a perspective view of a four-camera monitoring system positioned within a vehicle.
Figure 2:
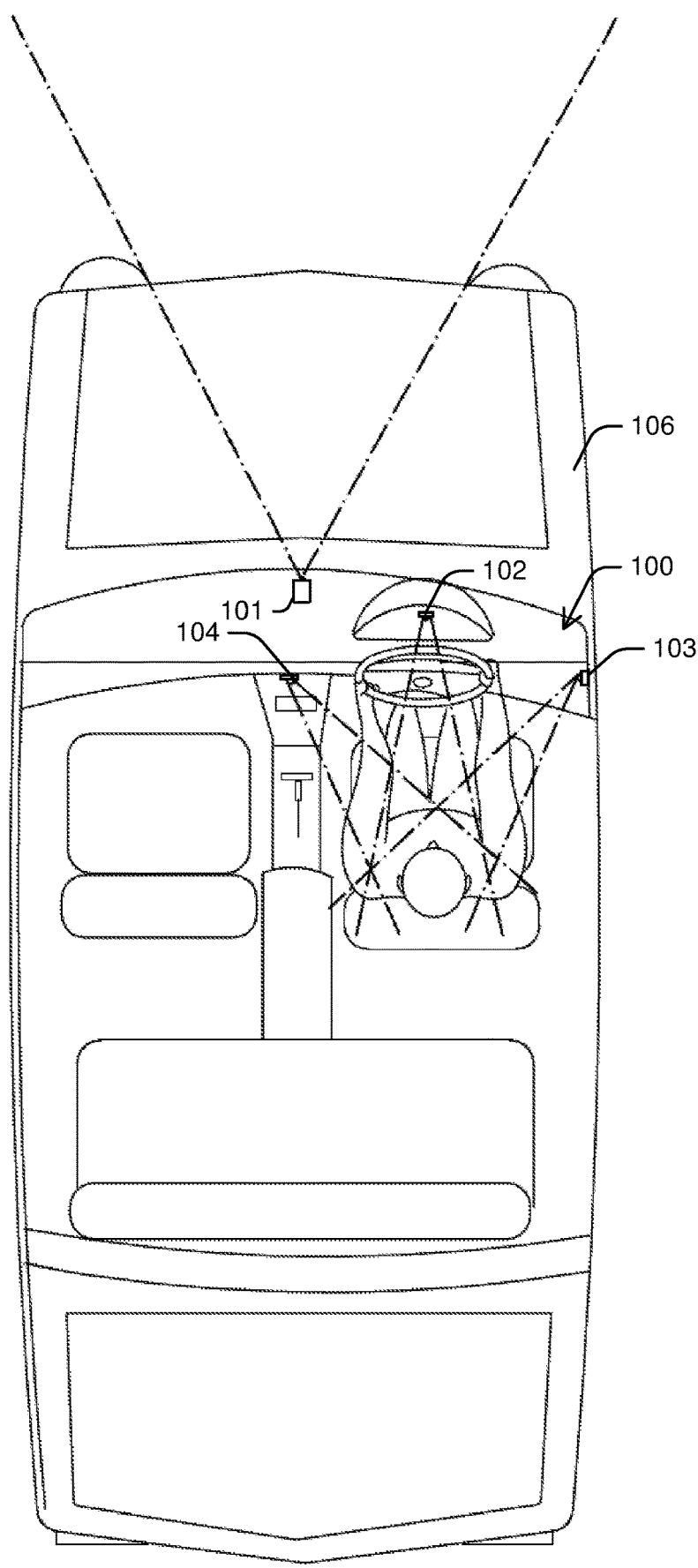
FIG. 2 is a plan view of the four-camera monitoring system of FIG. 1.

Referring initially to FIGS. 1 and 2, there is illustrated a vehicle monitoring system 100 including four cameras 101-104 disposed at different locations within a vehicle 106. Camera 101 is positioned on a dashboard of the vehicle and oriented in a forward direction of the vehicle for monitoring the forward road scene. Cameras 102, 103 and 104 are positioned and oriented to monitor a driver 108 of vehicle 106. Camera 102 is positioned on or adjacent an instrument panel of vehicle 106 or on the steering column of vehicle 106. Camera 103 is positioned on the driver side A-pillar of the frame of vehicle 106. Camera 104 is positioned on or adjacent a center console of vehicle 106, preferably adjacent a display screen in vehicles where such a screen is provided. The specific camera locations are exemplary only and it will be appreciated that more or less cameras can be incorporated at other locations within or outside vehicle 106 to monitor the driver, the forward road scene or other views in or around the vehicle. Other exemplary camera locations of cameras include a rearview mirror, rear bumper, front bumper, vehicle roof and bonnet/hood.

Figure 3:
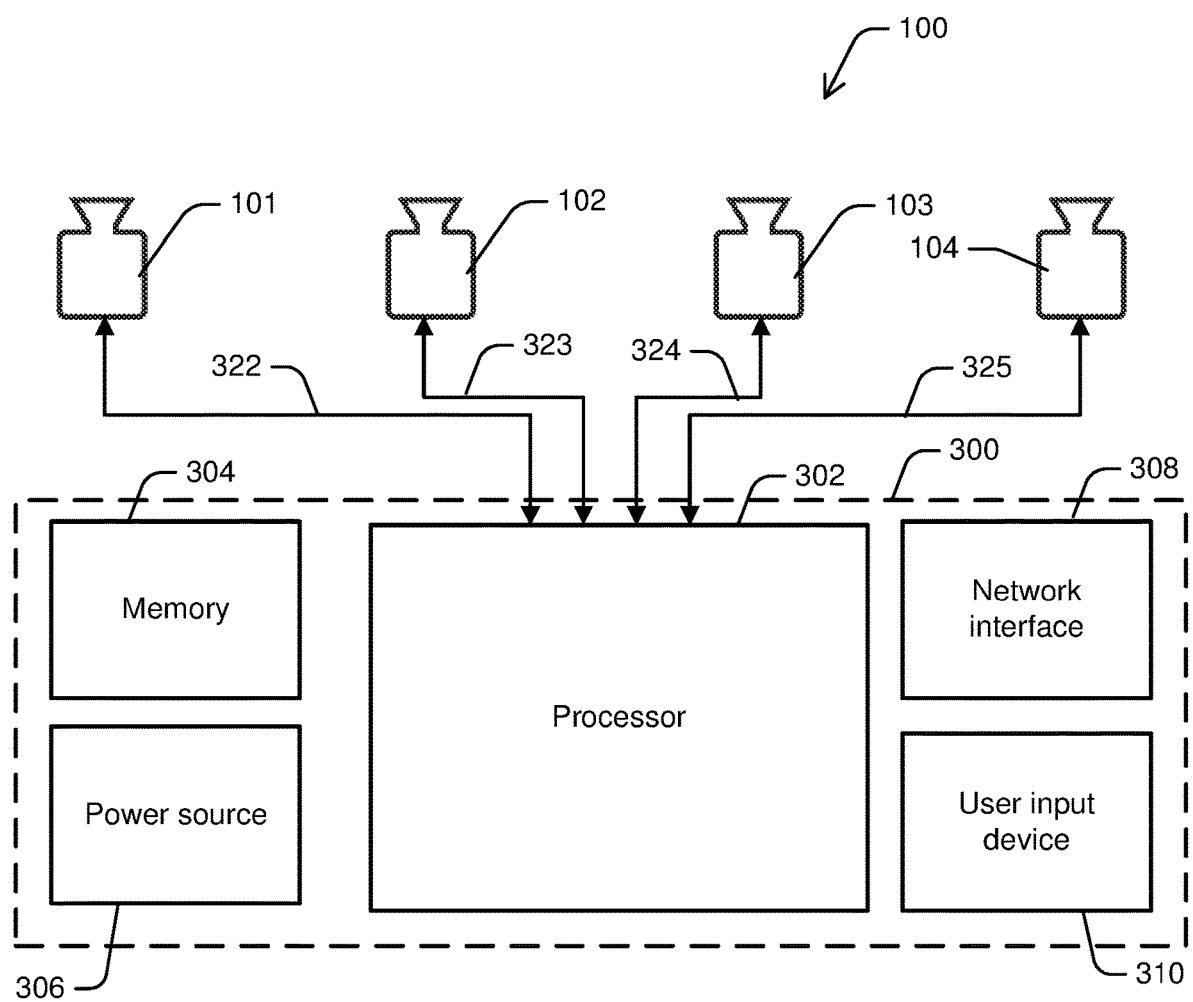
FIG. 3 is a schematic system level diagram of the four-camera monitoring system of FIGS. 1 and 2.

Referring now to FIG. 3, there is illustrated a system level diagram of system 100. System 100 includes a central processing unit 300 including a processor 302, memory 304, a power source 306, a network interface 308 and a user input device 310. In the embodiments of a vehicle monitoring system, central processing unit 300 is preferably mounted within the vehicle dash or centre console and can be integrated with an onboard vehicle computer system during manufacture. However, central processing unit 300 and system 100 as a whole may be manufactured as an aftermarket product and subsequently installed into vehicle in a modular manner.

Processor 302 may represent a conventional microprocessor or personal computer having hardware and/or software configured for processing image streams received from multiple cameras. By way of example, processor 302 may include system-on-chip technology and include a video processing pipeline for processing the stream of images from cameras 101-104. In one embodiment, processor 302 is integral with or in communication with a processor of an onboard vehicle computer system.

Central processing unit 300 is powered by connection to a power source 306. In one embodiment, power source 306 represents an electrical connection to a vehicle power source such as the vehicle battery. In another embodiment, power source 306 represents a local battery integrated within a housing of central processing unit 300 and optionally connected to an external power source for recharging.

Network interface 308 provides for communicating data to and from system 100 and represents an electrical or wireless interface for connecting system 100 to other devices or systems. Network interface 308 includes wired network ports such as USB, HDMI or Ethernet ports, serial device ports and/or wireless devices such as a Bluetooth™ device, Wi-Fi™ device or cellular network transceiver.

User input is able to be provided to system 100 through user input device 310, which can include a touchscreen display or a keyboard or keypad and associated display. User input device 310 may also represent external devices such as computers or smartphones connected to system 100 through network interface 308 or other means. In one embodiment, user input device 310 represents a computer system integrated into the vehicle and manipulated through a display interface mounted in the vehicle's centre console.

Example data that can be input to system 100 through user input device 310 includes:
  Vehicle scene reference data including a three dimensional model of the vehicle cabin or two dimensional image of the vehicle scene;
  Initial or reference position and orientation data for cameras 101-104;
  Positions of other reference points in the vehicle;
  Model data of the vehicle or vehicle cabin;
  Driver images for facial recognition;
  Driver details such as driver height for determining eye positions within the vehicle; and
  Software updates for processor 302 such as updated gaze tracking algorithms.

Example data that can be extracted from system 100 through user input device 301 includes:
  Statistical gaze direction data;
  Camera calibration or realignment data; and
  Raw or processed image/video data from cameras 101-104.

Each camera is electrically connected to central processing unit 300 through respective connections 322-325 including electrical cables and associated electrical ports. The electrical connections provide for control of cameras 101-104 by processor 302 and transmission of image data from cameras 101-104.

Cameras 101-104 may utilize various types of known image sensors in combination with imaging optics. Example image sensors include charge-coupled devices (CCDs) or complementary metal-oxide-semiconductor (CMOS) chips combined with relevant processing electronics and memory to capture images and/or video sequences in suitable formats for subsequent image processing. Cameras 101-104 may be capable of capturing images in two or three dimensions.

Monitoring system 100 preferably also includes one or more LEDs (not illustrated) for illuminating driver 108 to improve the quality of the captured images. To reduce distraction to the driver, the LEDs preferably emit infrared radiation that is invisible to the human eye. Thus, the image sensors of cameras 101-104 are preferably capable of imaging in the infrared region to leverage the illumination by the LEDs.

For the cameras of system 100 to efficiently and accurately monitor driver behavior, the camera pose must be accurately known.

Figure 4:
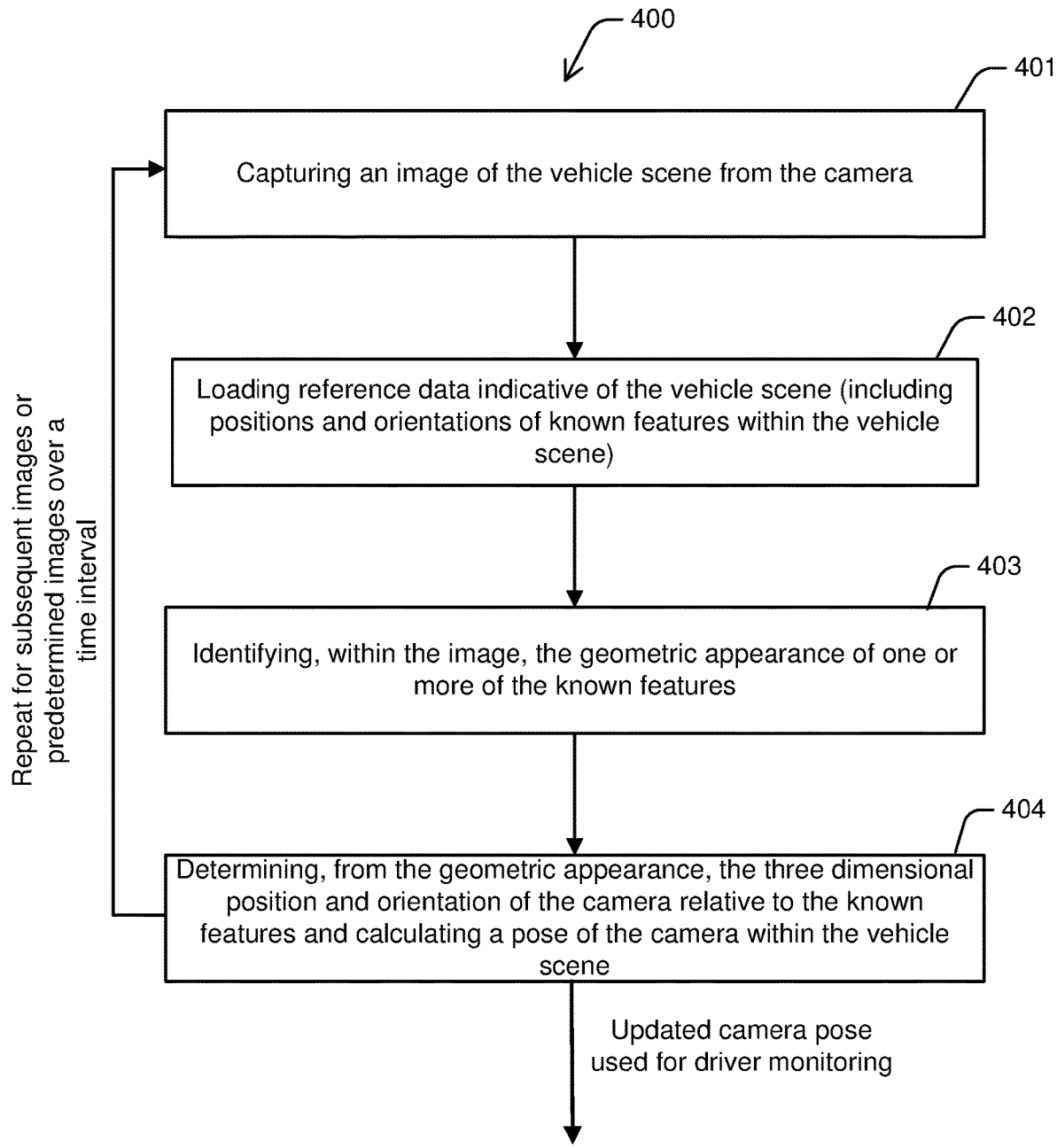
FIG. 4 is a functional flow diagram illustrating the primary steps in a method of determining a pose of a camera within a vehicle scene.

The operation of system 100 to perform a method 400 of determining a pose of cameras 101-104 will be described with reference to FIG. 4. Method 400 is performed for each camera in system 100 (provided those cameras can view part of the vehicle scene) and will be described for camera 102 only, noting that the operation for cameras 101, 103 and 104 is identical. It will be appreciated that this method can be performed for systems having other numbers of cameras, including a single camera.

At step 401, camera 102 captures an image of the vehicle scene from its current pose. A camera pose includes the three dimensional position and three dimensional orientation of the camera and is defined relative to a predefined frame of reference, as described below. The image data is transferred to central processing unit 300 by connection 322 for processing by processor 302.

At step 402, reference data indicative of the vehicle scene is loaded from memory 304. In one embodiment, the reference data includes a three dimensional model of the vehicle scene such as a CAD model created during vehicle manufacture. In another embodiment, the reference data includes a two dimensional image of the vehicle scene captured at an earlier time and at an accurately known camera pose. An example may be an image captured by the camera shortly after its initial installation in the vehicle. In either embodiment, the reference data includes positions and orientations of known features within the vehicle scene defined in a reference coordinate frame. By way of example, the known features may include individual vehicle dashboard instruments, definable cabin contours, edges, or objects or the entire vehicle cabin itself. One requirement is that the features are fixed in time and space relative to the frame of reference.

In the case of a vehicle scene, the frame of reference may be defined relative to a region of the vehicle frame. By way of example, a reference coordinate system may be defined as having a z-axis aligned along the vehicle drive shaft (longitudinal dimension), an x-axis aligned along the front wheel axle (defining a transverse dimension) with the right wheel being in the positive direction and a y-axis defining a generally vertical dimension to complete the orthogonal coordinate system. This exemplary coordinate system will be used herein to describe the disclosure. However, it will be appreciated that other arbitrary reference coordinate systems may be chosen.

At step 403, processor 302 processes the captured image and identifies the geometric appearance of one or more of the known features. In one embodiment, this includes performing an image or pattern matching technique on the known features in a similar manner to facial recognition to determine the two dimensional location of the known features in the captured image. A similar image matching procedure is performed in U.S. Pat. No. 7,043,056 to Edwards et al. entitled "Facial Image Processing System", which is assigned to Seeing Machines Pty Ltd (hereinafter "Edwards et al."). The contents of U.S. Pat. No. 7,043,056 are incorporated herein by way of cross reference. This technique involves dividing the image into sub-regions and processing those sub-regions to identify patterns that match stored template patterns.

Figure 5:
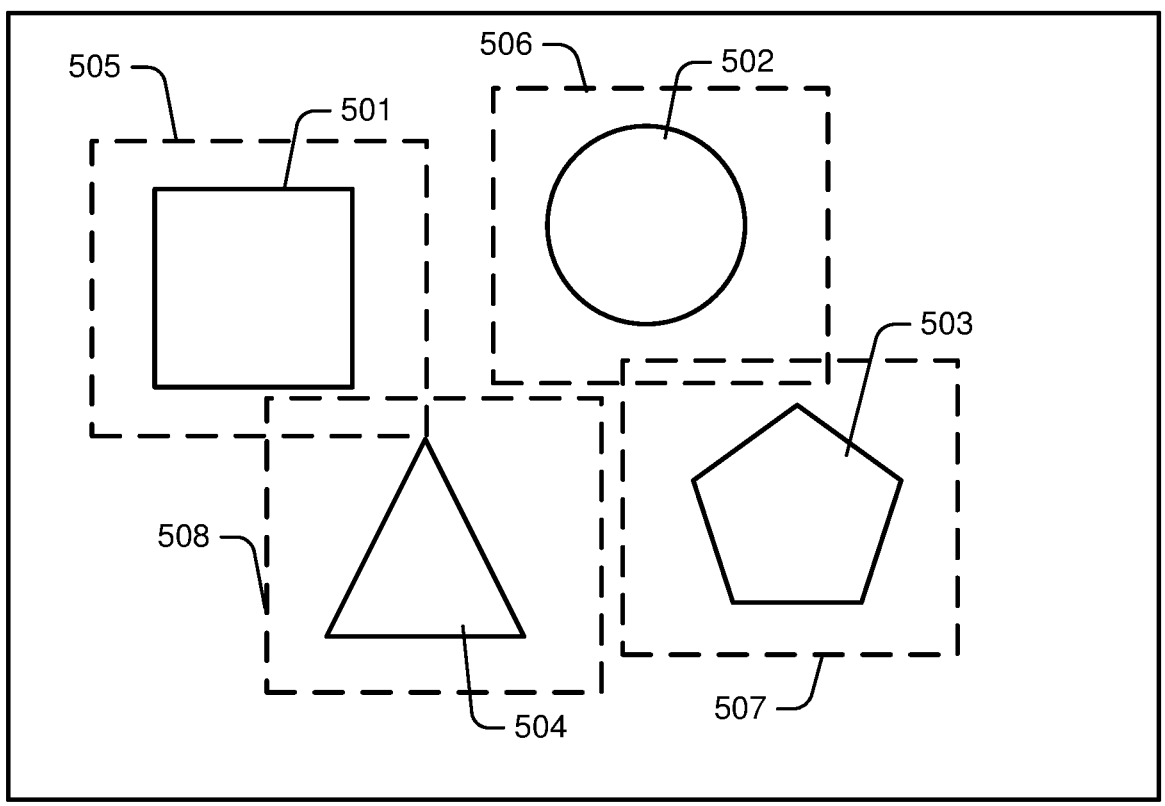
FIG. 5 is a schematic illustration of a scene including four reference features in the form of geometric shapes.

The identified features are stored as subset regions or coordinates of pixels within the image. This is illustrated schematically in FIG. 5 wherein four example reference features 501-504, illustrated as conventional geometric shapes, can be seen. The dashed boxes 505-508 around each feature illustrate the pixel regions within the image designated to correspond to those features. The pixels can be individually identifiable in two dimensional pixel coordinates of the sensor array. Although the pixel regions are illustrated as being rectilinear, in other embodiments the pixel regions may be defined by other shapes.

At step 404, processor 302 determines, from the geometric appearance, the three dimensional position and orientation of the camera relative to the known features identified in step c) and calculates a pose of the camera within the vehicle scene. In the case where the reference data includes a three dimensional model of the scene, step 404 may involve fitting the image onto the three dimensional model using a minimization of the location of the known features in the image with corresponding features in the model. This may involve projecting the two dimensional positions of the reference features identified in the image into three dimensions to fit the model. Alternatively, two dimensional image may be rendered from the model and the comparison performed between the captured image and the rendered image. Thus, the minimizing may be performed by comparing two dimensional feature locations in the image with two dimensional feature locations in the mode or by comparing the three dimensional feature locations in the image and three dimensional locations in the model.

Step 404 preferably includes minimizing the error between the feature locations in the image and the corresponding feature locations within the model as the model is varied to simulate different fixed camera poses. Varying the model includes rotating the model in one or more rotational dimensions and translating the model in one or more linear dimensions. In the case where the reference information includes a two dimensional image captured previously at a known camera pose, step 404 includes performing an error minimization to align the known features in the current image with the corresponding features in the earlier image and extracting the camera pose from the required alignment.

Figure 6:
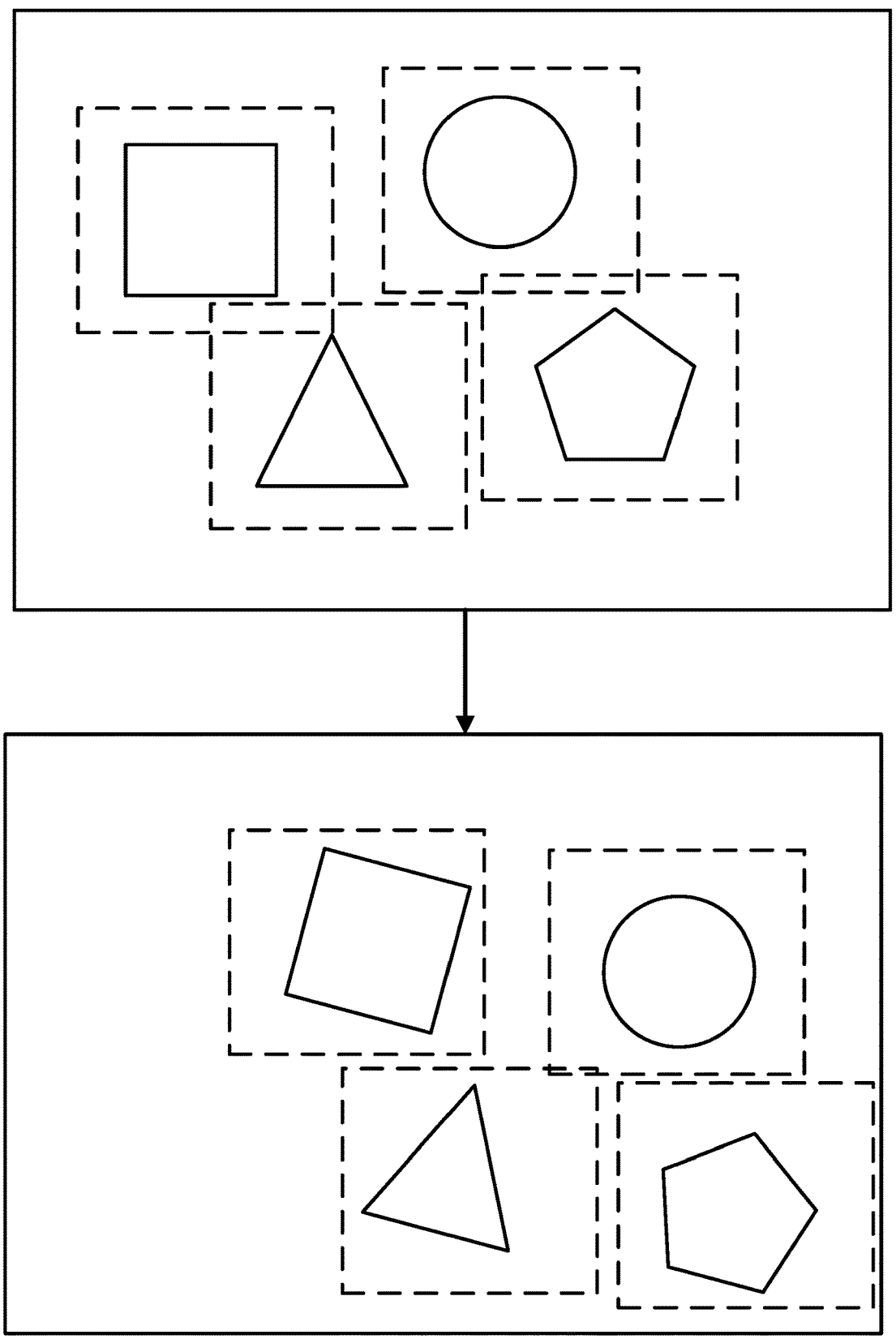
FIG. 6 is a schematic illustration of a scenario comparing a reference model or image of the scene and an image of the scene captured by a camera from a different camera pose.

To illustrate this process schematically, the upper panel of FIG. 6 illustrates a model of four geometric shapes, representing known features having known positions and orientations within a scene. Alternatively, the top panel may represent a two dimensional image captured at a precisely known camera pose. The lower panel illustrates an image, captured by the camera to be calibrated, of the same scene of four shapes but slightly rotated and offset to represent a varied camera pose. Through pattern matching, the geometric shapes can be identified in the lower image and matched to the shapes in the model. If the position and orientation of the geometric shapes within the scene are accurately known in the model, the pose of the camera can be deduced from the image. The camera pose can be calculated from the amount of rotation that is required to fit the shapes to the geometrical constraints of the model as shown in the upper panel. Similarly, where the reference data is an earlier captured image, the new camera pose can be calculated from the earlier known camera pose by the difference in position and orientation of the shapes across the two images.

In the example illustrated in FIG. 6, note that the circular shape is rotationally invariant. Similarly, spheres are rotationally invariant in three dimensions. Thus, to distinguish camera pose, additional information such as the positions of these objects relative to other features are required.

Figure 7:
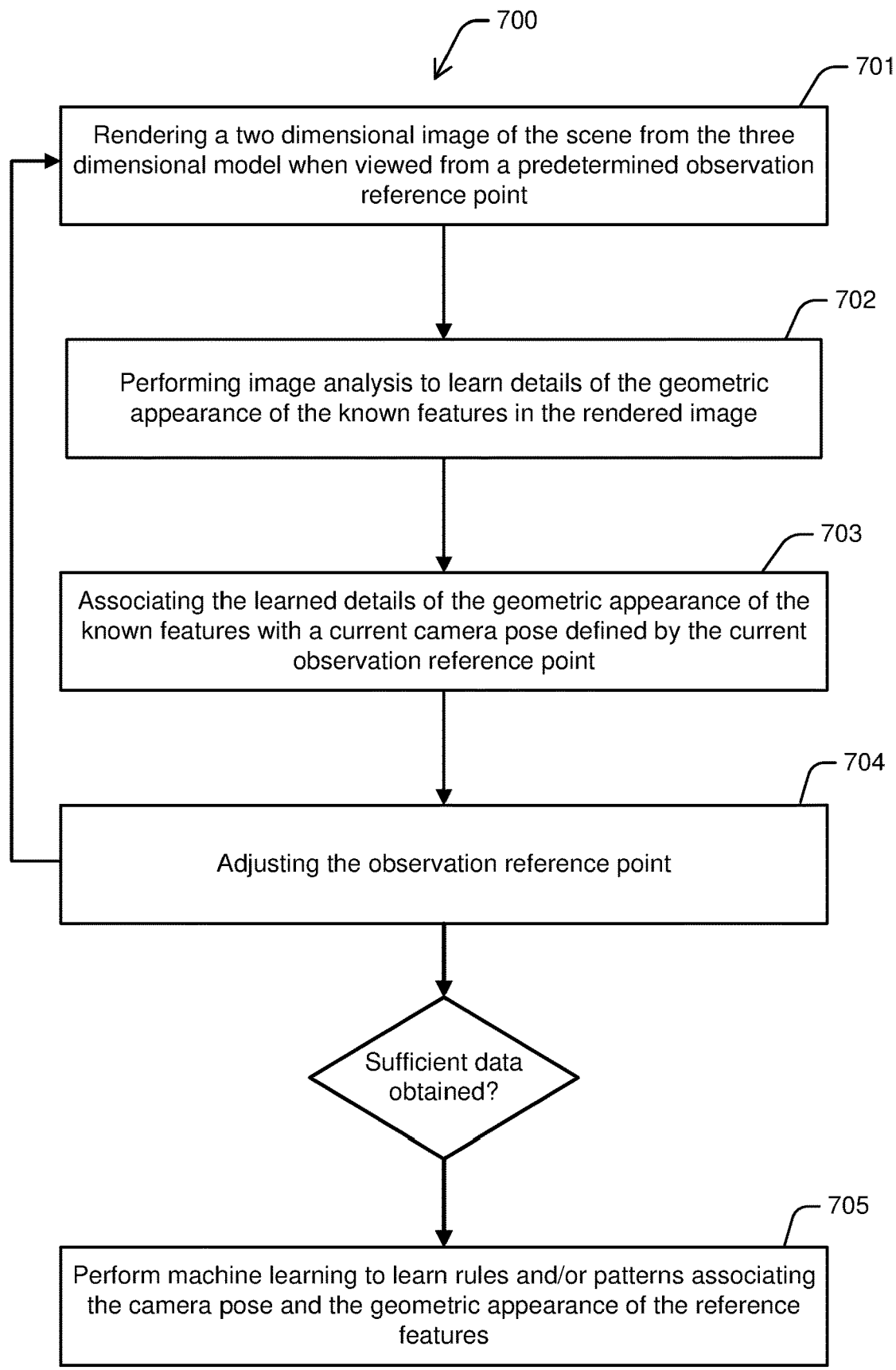
FIG. 7 is a functional flow diagram illustrating the primary steps in a method of training a neural network to estimate camera pose from the geometrical appearance of reference features.

In another embodiment, step 404 is performed using a machine learning algorithm, such as a neural network, trained to recognize the camera pose from the identified known features. The neural network may be trained to recognize the known features from various different positions and orientations within or about the vehicle scene. Training of the neural network can be performed by method 700 illustrated in FIG. 7.

At step 701, a two dimensional image of the scene is rendered from the three dimensional model when viewed from a predetermined observation reference point. The reference point is a position and orientation within or about the scene which simulates a camera viewing the scene at a particular camera pose. At step 702, processor 302 performs image analysis to learn details of the geometric appearance of the known features in the rendered image. The image analysis performed may include pattern matching and/or shape recognition. The geometric appearance may include the size, shape and orientation of a known feature. At step 703, the learned details of the geometric appearance of the known features are associated with a camera pose defined by the current observation reference point. At step 704, the observation reference point is adjusted and steps 701 to 703 are repeated. The observation reference point can be adjusted by varying one or both of the reference position or orientation. At step 705, when sufficient data has been gathered, a neural network or other machine learning algorithm is performed by processor 302 to learn rules or patterns associating the camera pose and geometric appearance of the reference features.

Figure 8:
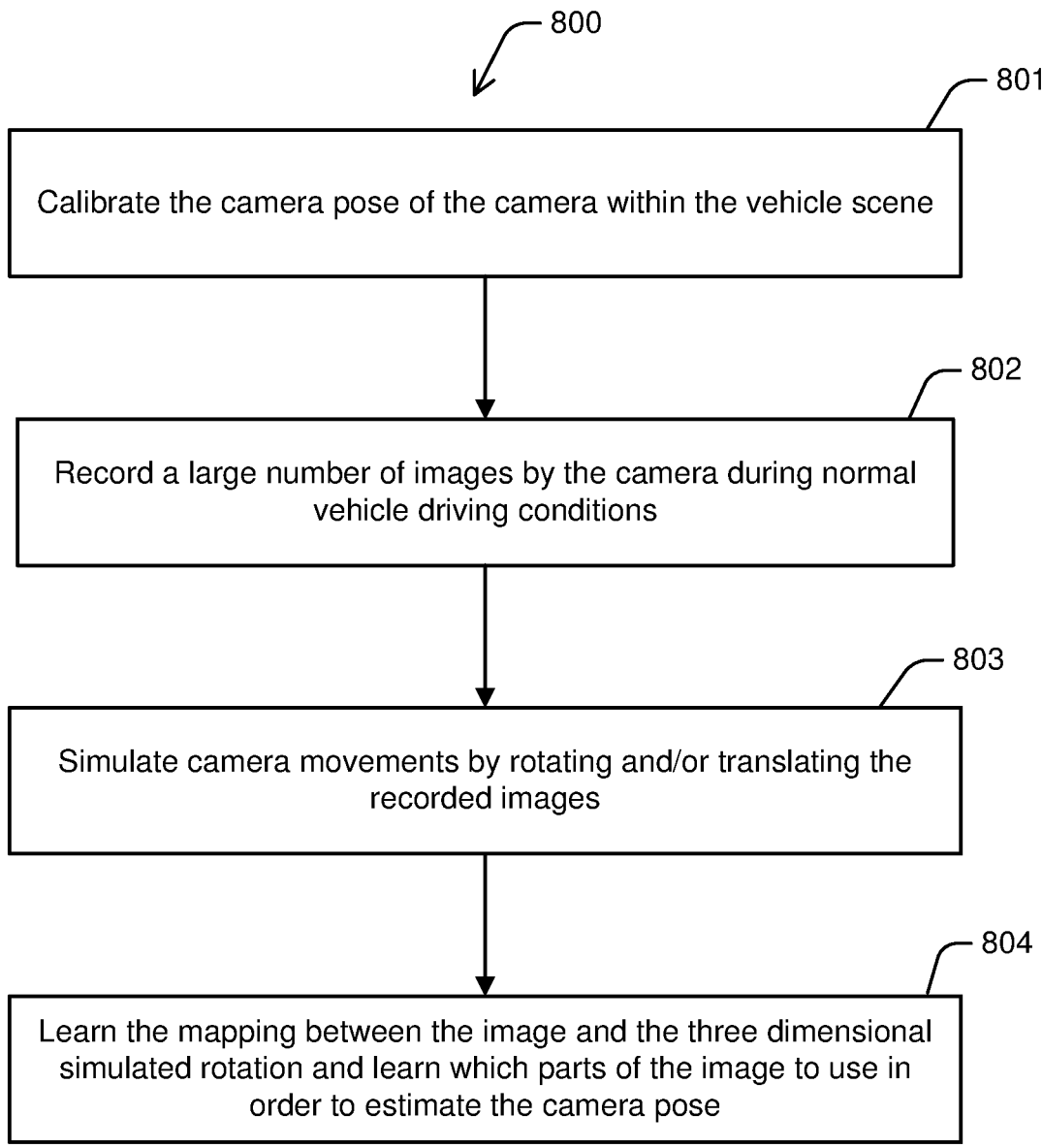
FIG. 8 is a functional flow diagram illustrating the primary steps in a method of training a neural network to learn which sections of a captured image to apply for determining camera pose.

A neural network or other machine learning algorithm could also be used to 'learn' which part of the image to use for the estimation of the camera pose from an initial accurately known camera pose. This can be a difficult problem, for example, occlusion by the driver or other objects, wrong exposure, etc. One practical approach for this process is illustrated in FIG. 8 as method 800.

At step 801, the camera pose of the camera is calibrated within the vehicle scene. This may be performed by a manual calibration or using a process described above. At step 802, a large number of images are recorded by the camera during normal vehicle driving conditions, making sure camera pose stays consistent. This may include hours, days, weeks or months of recorded image data. At step 803, camera movements are simulated by rotating and/or translating the recorded images. This creates a lot of additional training data for a machine learning algorithm. At step 804, a convolutional neural network or other machine learning process is used to learn the mapping between the image and the three dimensional simulated rotation. If there are enough variations in the images (different drivers, lighting, external scene, etc.), then the network will automatically learn which parts of the image to use in order to estimate the camera pose.

Additionally, the convolutional neural network may data use input from additional sensor inputs such as accelerometers or gyroscopes to get a more robust estimation.

Once method 700 and/or method 800 has been performed, images captured by the camera can be processed and the rules and patterns applied to estimate the current camera pose from the identified reference features.

In some embodiments, the reference data includes camera orientation data received from an orientation sensor mounted to the camera. This scenario is described in more detail below. The orientation data from the sensor may also be compared to second orientation data received from an orientation sensor mounted to the vehicle frame, such as an on-board vehicle sensor.

The above described method 400 may be performed repeatedly to re-calibrate the camera pose if and when necessary. In one embodiment, method 400 is performed each time the vehicle is started and system 100 is powered up. When performed over time, method 400 allows for automatically determining camera pose without the need for additional system hardware. This ongoing determination significantly improves the performance of monitoring systems such as driver gaze monitoring.

The use of a three dimensional model is also advantageous in simplifying the installation process of the cameras. In particular, the cameras can be simply installed at the desired locations without the need to perform an initial determination of camera pose. Rather, the camera pose can be initially determined from method 400.

Alternative Embodiments

Figure 9:
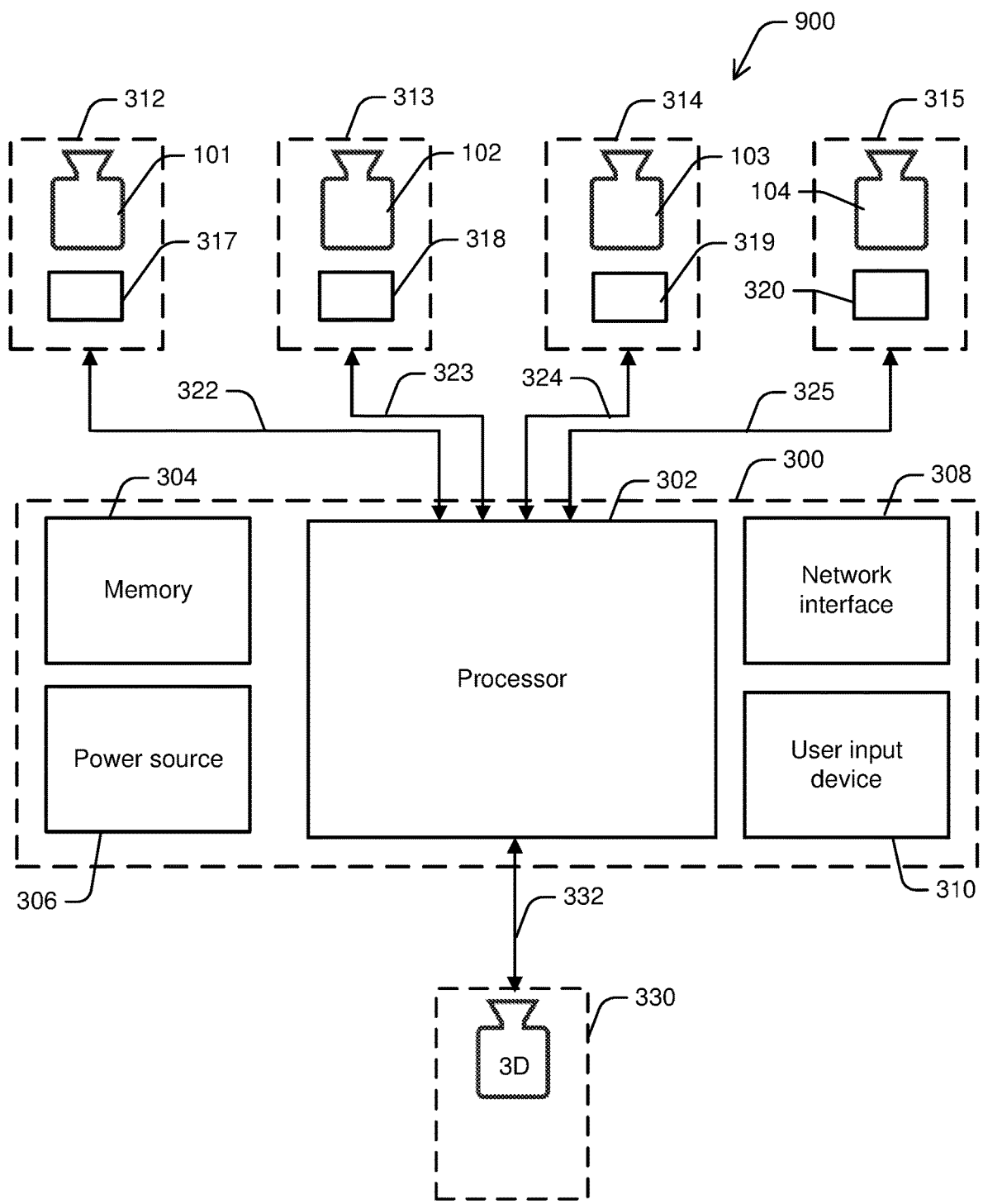
FIG. 9 is a schematic system level diagram of a four-camera monitoring system, with each camera including an orientation sensor for actively sensing the orientation of the cameras.
Figure 10:
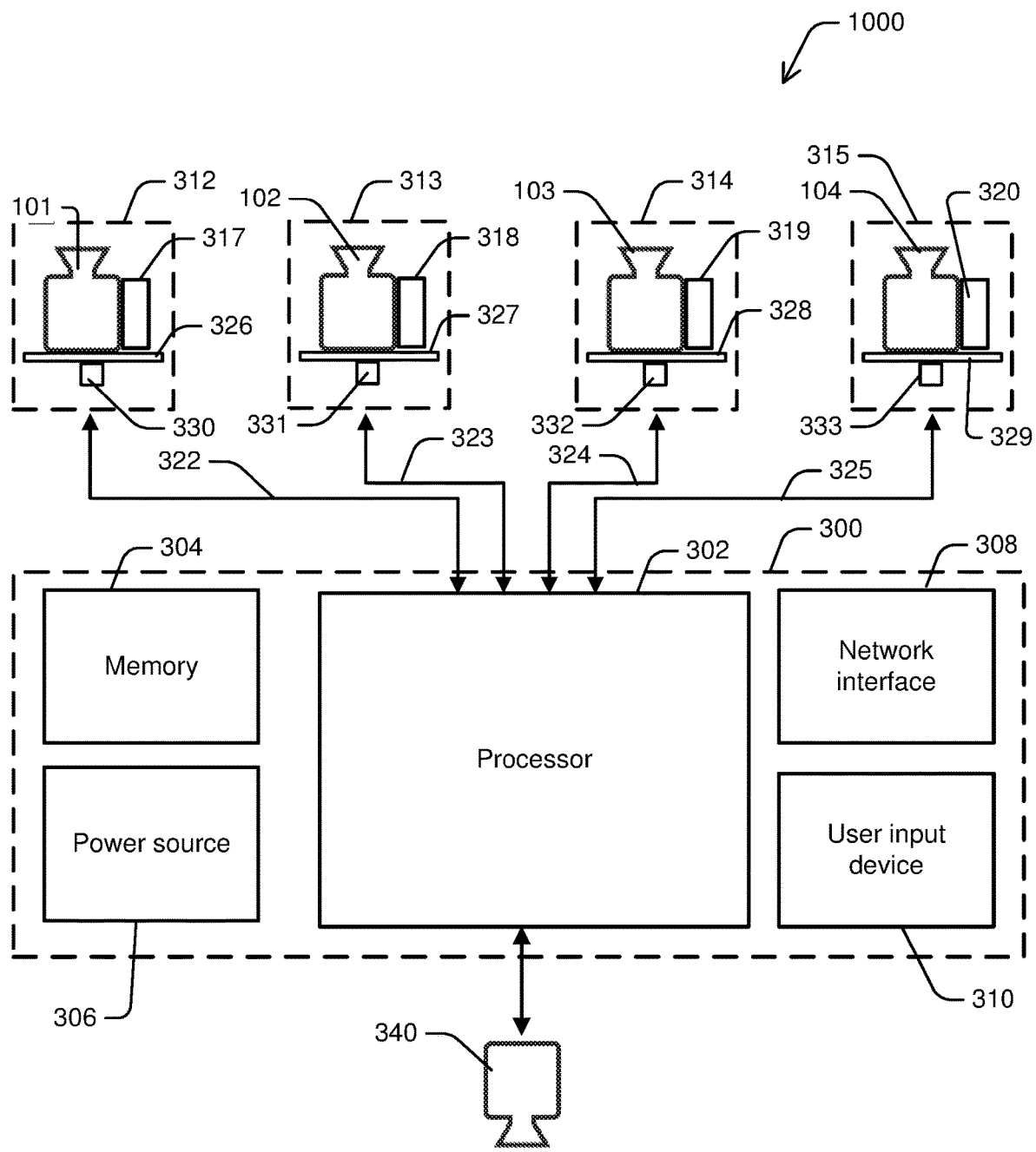
FIG. 10 is a schematic system level diagram of a four-camera monitoring system, with each camera including an orientation sensor for actively sensing the orientation of the cameras and an actuator or actively adjusting the orientation of the cameras.

An alternative embodiment system 900 is illustrated in FIG. 9. Here corresponding features of system 100 are designated with the same reference numerals. System 900 includes four camera units 312-315, which are mounted at relative locations within or about the vehicle scene. Each camera unit 312-315 includes a respective camera 101-104 for capturing images of the scene within its respective field of view and an orientation sensor 317-320 for measuring the orientation of the camera relative to a reference orientation.

Orientation sensors 317-320 may include simple inertial devices such as accelerometers and gyroscopes and other devices such as magnetometers and more advanced inertial measurement units, or combinations thereof. Orientation sensors 317-320 may be capable of measuring orientation in one, two or three dimensions relative to a reference orientation fixed with respect to the vehicle frame of reference. A suitable reference system is that described above using the vehicle drive shaft and front wheel axle. However, it will be appreciated that a reference orientation can be chosen arbitrarily based on the particular application. For example, if two or more cameras were aligned along a common axis, that axis may be preferred as the reference orientation. The orientations are preferably expressed in a three dimensional Cartesian coordinate system. However, it will be appreciated that the orientations can be expressed in any arbitrary coordinate system such as a spherical coordinate system wherein an orientation vector is expressed in terms of a radial distance (r), a zenith angle ($\theta$) in a vertical plane and an azimuthal angle ($\phi$) in a horizontal plane.

In one embodiment, the orientation sensors 317-320 are mounted integrally on respective cameras 101-104. In another embodiment, orientation sensors 317-320 are mounted relative to each camera 101-104 on an intermediate support frame on which the camera is also mounted. In any case, the sensors must be fixed with respect to each corresponding camera.

In system 900, the electrical connections 322-325 also provide for transmission of orientation data from orientation sensors 317-320 to processor 302 and memory 304.

A further alternative system 1000 is illustrated schematically in FIG. 9. In system 900, each camera unit is mounted to the vehicle by a fixed or adjustable camera mount 326-329. Each mount 326-329 is operatively associated with or includes an associated electromechanical actuator 330-333 that is adapted to selectively adjust the orientation of the at least one camera in one, two or three dimensions by varying the adjustable mount. In the illustrated system 900, each of the camera units 312-315 includes an adjustable mount 326-329 and an associated actuator 330-333. However, in other embodiments, only a subset of the camera units includes actuators or no actuators are provided and the orientation of the cameras may be manually adjustable within their respective mounts.

Various types of camera mounts and actuators are able to be used in the present disclosure, including but not limited to C-type or T-type screw threaded mounts, hydraulic actuator mounts, thermal or magnetic actuator mounts and piezoelectric actuator mounts.

As with systems 100 and 900, each unit is electrically connected to central processing unit 300 through respective connections 322-325 including electrical cables and associated electrical ports. In addition to providing the functions described above, connections 322-325 also facilitate transmission of actuator adjustment signals from processor 302 to each actuator 330-333.

Figure 11:
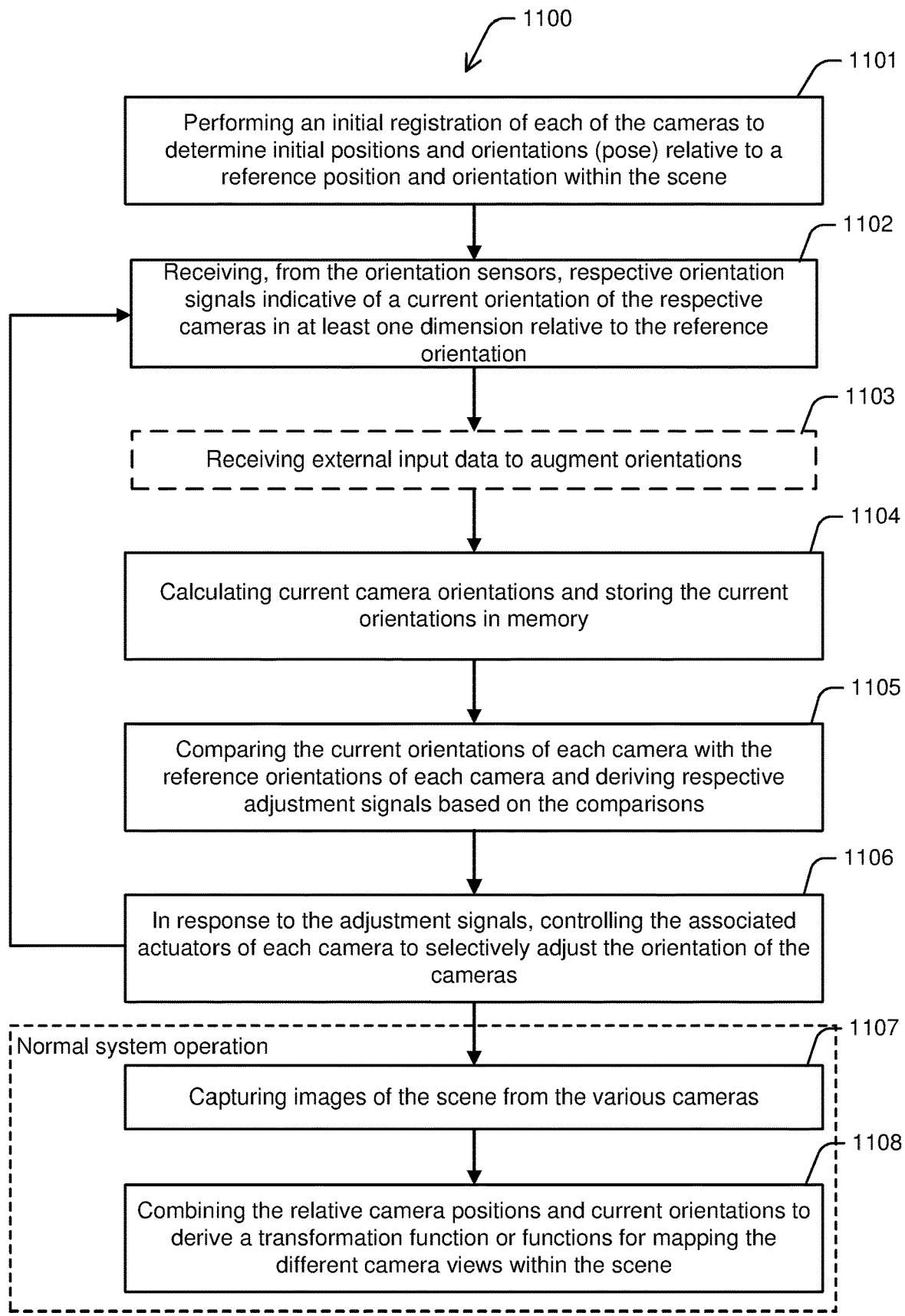
FIG. 11 is a functional flow diagram illustrating the primary steps in a method of automatically calibrating the orientation of cameras in a multi-camera imaging system.

The operation of system 1000 can be used to automatically physically re-calibrate the orientation of a plurality of cameras in the multi-camera imaging system. This operation will be described with reference to method 1100 illustrated in the process flow diagram of FIG. 11.

Initially, at step 1101 the cameras are installed in their desired locations within the scene to be monitored and their respective positions and initial orientations are registered in memory 304 through user input device 310. In the case of a driver monitoring system, the cameras are preferably mounted at locations in or around the vehicle such as those in FIGS. 1 and 2 so as to position the driver and the forward road scene within their respective fields of view. Step 1101 may be performed during manufacture of the vehicle or during a subsequent installation of system 100 in vehicle 106.

The initial position/orientation registration of step 1101 may be performed manually or in a quasi-automated manner utilizing orientation sensors 317-320 and a depth imaging device 340 as described in Australian provisional patent application 2016902544, filed on 29 Jun. 2016. The contents of Australian provisional patent application 2016902544 are incorporated herein by way of cross reference. Depth imaging device 340 can include one or more of a scanning or pulsed time of flight camera, LIDAR system, stereoscopic camera arrangement, structured light 3D scanner, image sensor with phase detection or any other imaging system capable of capturing images of a scene in three dimensions. Depth imaging device 340 is operatively associated with processor 302 through a dedicated electrical connection to provide control to device 340 and receive raw three dimensional image data or pre-processed depth map data from device 340. In some embodiments depth imaging device 340 is connected to central processing unit 300 and processor 302 through network interface 308.

Alternatively, step 1101 may be performed automatically using method 400 described above and using a three dimensional model of the scene.

During the installation of the camera units 312-315, each unit is electrically connected to central processing unit 300 through respective connections 322-325. At step 1001, a reference position and orientation within the scene is defined. In one embodiment, the reference orientation is a world reference coordinate system defined by the scene geometry. In the case of a vehicle monitoring system, the world coordinate system may be the coordinate system described above using the vehicle drive shaft and front wheel axle. However, as mentioned above, an arbitrary reference orientation can be chosen by a user through user input device 310 based on the particular application. For example, if two or more cameras were aligned along a common axis, that axis may be a preferred axis for the reference orientation. Preferably, the reference orientation is defined by the scene geometry such that it remains constant over time.

The reference position and orientation will act as the central reference frame (or world reference) from which all measurements within system 100 will be taken. This common reference frame allows for mapping and tracking of objects or points of interest (such as a person's gaze point of regard) across different images. Positions and orientations of cameras 101-104 within the scene are specified in coordinates relative to the reference position/orientation.

At step 1102, orientation signals indicative of each camera orientation is received at processor 302 from the respective orientation sensors 317-320 through signals 322-325. Preferably the orientation signals include a camera orientation in two or three dimensions. However, the orientation sensors may only provide orientation in one dimension and the remaining dimensions may be measured manually or assumed to be unchanged. The orientations are defined relative to the reference orientation described above.

At optional step 1103, processor 302 receives external input such as velocity or acceleration data of the vehicle, a GPS position of the vehicle, or a current orientation of the vehicle measured by an on-board sensor (e.g. to detect when the car is parked on a slope). By way of example, system 100 may be connected to an onboard vehicle computer system through network interface 308 which provides a feed of vehicle data such as vehicle GPS position, velocity and acceleration. The external input data is used to augment the orientation data to aid in the calculation of camera orientations, particularly when the orientation sensor is only capable of measuring orientation in one or two dimensions. By way of example, yaw orientation (in the vertical axis) is typically difficult to determine when the camera is stationary under the constant force of gravity. Measuring a change in position, velocity or acceleration of the camera as the vehicle is in motion can help to determine an overall force vector from which the orientation of the camera in three dimensions can be extrapolated.

At step 1104, processor 302 calculates a current orientation of each camera and stores the current orientations in memory 304 for subsequent use by monitoring algorithms. To measure a current camera orientation, the orientation signals are monitored for a period of time such as 30 seconds to observe a window of data. This allows processor 302 to determine a steady state orientation and distinguish from small time varying changes in orientation of the cameras. The data obtained in step 403 may be incorporated here, particularly when the vehicle is in motion.

In some embodiments, the current camera orientation data is directly updated in the algorithms themselves, which are also stored in memory 304. Step 1104 may be performed in real-time, near real-time, or at predetermined time intervals.

In some embodiments, the calculation of current camera orientations includes determining a differential or relative orientation between two cameras or between a camera and another reference point such as a vehicle on-board accelerometer. By way of example, initially, camera 101 has an orientation (expressed as a unit orientation vector) of $\langle 0,0,1 \rangle$ to represent a forward-facing view and camera 102 has an orientation $\langle 0,0,-1 \rangle$ to represent a backward facing view. The initial differential or relative orientation between cameras 101 and 102 is $\langle 0,0,2 \rangle$. After a period of vehicle operation, the orientation of camera 101 has shifted to $\langle 0.2, 0.1, 1.2 \rangle$ and the orientation of camera 102 has shifted to $\langle 0.3, -0.2, -0.9 \rangle$. The differential or relative orientation between cameras 101 and 102 is now $\langle -0.1, 0.3, 2.1 \rangle$.

At step 1105, processor 302 compares the current orientations of each camera with the reference orientations of each camera and derives respective adjustment signals based on the comparisons. At step 1106, controller 302 sends the adjustment signals along respective electrical connections 322-325 to control the associated actuators 330-333 of each camera module 312-315 to selectively adjust the orientation of the cameras.

The adjustment signals represent control signals for controlling the actuator to bring the orientation of the associated camera back into close conformity with the reference orientation or another predefined orientation relative to the reference orientation (to within a margin of error). By way of example, a reference orientation of camera 101 may be expressed as unit orientation vector $\langle 0,0,1 \rangle$ to indicate a direct forward-facing view. After a period of vehicle operation, the actual orientation vector may have shifted to $\langle 0.2, 0.1, 1.2 \rangle$. The processor 302 performs a vector comparison to determine that a correction of $\langle -0.2, -0.1,$ −0.2) is required to reorient the camera to its reference position. By referencing an angle-to-voltage/current lookup table stored in memory 304, processor 302 converts this vector correction value to a corresponding electrical control signal to electrically control the corresponding actuator.

In the case where the actuator/mount is adjustable in three dimensions, the adjustment signals may include three individual control components or three separate signals. In the case where the actuator/mount is adjustable in fewer than three dimensions, the orientation components not able to be adjusted are ignored and assumed to be zero. Alternatively, processor 302 may issue an alert to a user to indicate that orientation components unable to be automatically adjusted have drifted outside of a desired range. In this case, the camera may need to be manually reoriented or method 400 performed to automatically determine the current camera pose.

In some embodiments, a predefined threshold orientation error is defined wherein, if the difference between the current orientation and reference orientation of a camera is less than the threshold orientation error, no adjustment of the camera is performed. By way of example, the threshold orientation error may represent an error limit of the orientation sensor or the minimum resolution of the associated actuator.

Steps 1102 to 1106 represent the main calibration loop for automatically calibrating the orientation of the cameras within system 1100. Steps 1102 to 1106 may be performed at predetermined regular times during vehicle operation such as at vehicle startup and regular intervals thereafter. Alternatively, steps 1102 to 1106 may be performed in real or near-real time during vehicle operation.

At step 1107, during normal operation of system 1100, cameras 101-104 capture streams of images of the scene from the various camera positions/orientations to be processed by processor 302. Exemplary processing includes facial feature identification and tracking of a vehicle driver by cameras 102-104 to determine driver drowsiness, attention and eye gaze direction as described, for example, Edwards et al.

With both the three dimensional position and three dimensional orientation of each camera accurately known within the scene, a camera pose for each camera can be determined. At step 1108, processor 302 combines the three dimensional position data, orientation data and optionally the external input data for each camera to determine a camera pose for each camera. The camera pose includes a six dimensional vector indicating the three dimensional position of the camera sensor array and three dimensional orientation of an optical axis of the camera. Processor 302 combines the different camera poses to derive transformation functions for mapping the different camera views within the scene.

SUMMARY

It will be appreciated that the systems and methods described above provide for efficiently and accurately determining a current pose of cameras in a camera monitoring system. In some embodiments, the determination is made through comparison to reference information without the need for any additional hardware. For example, the system may refer to an accurate three dimensional model of the scene or a previous image captured by the camera at an accurately known camera pose. As described above, this information is sufficient to allow determination of a camera's current pose, even if it has shifted over time. The use of a three dimensional model is particularly advantageous as the camera can be easily installed without performing an initial arduous manual calibration procedure.

In other embodiments, the system may determine the camera pose actively using on-board orientation sensors mounted to the cameras. In further embodiments, the cameras are fitted with actuators for actively adjusting the orientations of cameras. This automatic calibration allows the system to self-align during vehicle operation if the camera orientations are significantly varied by bumps etc. By accurately knowing the pose of the cameras, errors associated with tracking or projecting objects from one camera pose to another are greatly reduced.

INTERPRETATION

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "controller" or "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while diagrams only show a single processor and a single memory that carries the computer-readable code, those in the art will understand that many of the components described above are included, but not explicitly shown or described. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, further embodiments may include a method, an entirely hardware embodiment, an entirely software embodiment or an embodiment combining software and hardware features. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this specification to "one embodiment", "some embodiments" or "an embodiment" means that a particular feature, structure or characteristic described in connection with the embodiment is included in at least one embodiment of the present disclosure. Thus, appearances of the phrases "in one embodiment", "in some embodiments" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of exemplary embodiments of the disclosure, various features of the disclosure are sometimes grouped together in a single embodiment, Figure, or description thereof for the purpose of streamlining the disclosure and aiding in the understanding of one or more features. This method of disclosure, however, is not to be interpreted as reflecting an intention that the claims require more features than are expressly recited in each claim. Rather, as the following claims reflect, some embodiments may include less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical, electrical or optical contact, or that two or more elements are not in direct contact with each other but yet still co-operate or interact with each other.

In addition to the disclosed embodiments, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

We claim:

1. A processor-implemented method of determining a pose of a camera within a vehicle scene, the method comprising:
    a) capturing an image of the vehicle scene from the camera;
    b) loading, by a processor circuit, reference data indicative of the vehicle scene, the reference data including positions and orientations of known features within the vehicle scene, wherein the known features include a vehicle cabin or objects within a vehicle cabin that are fixed in time and space relative to a frame of reference defined relative to a region of the vehicle;
    c) identifying, by the processor circuit, a geometric appearance of one or more of the known features within the image;
    d) determining, from the geometric appearance, a three dimensional position and an orientation of the camera relative to the one or more known features identified in step c) and calculating a pose of the camera within the vehicle scene in the frame of reference.

2. The method according to claim 1, wherein the known features include definable cabin contours or edges.

3. The method according to claim 1, wherein the known features include vehicle dashboard instruments.

4. The method according to claim 1, wherein the reference data includes a three dimensional model of the vehicle scene.

5. The method according to claim 4, wherein step c) includes performing an image matching technique to determine a two dimensional location of the one or more known features in the image.

6. The method according to claim 5, wherein step d) includes fitting the image onto the three dimensional model using a minimization of the two dimensional location of the known features in the image with corresponding features in the model.

7. The method according to claim 6, wherein step d) includes minimizing the error between the two dimensional feature locations in the image and the corresponding feature locations within the model as the model is varied to simulate different fixed camera poses.

8. The method according to claim 7, wherein the minimizing is performed by comparing two dimensional feature locations in the image with two dimensional feature locations in the model.

9. The method according to claim 7, wherein the two dimensional feature locations in the image are projected into three dimensional coordinates and the minimizing is performed by comparing the three dimensional coordinates, projected from two dimensional feature locations in the image, with three dimensional locations in the model.

10. The method according to claim 5, wherein step d) includes applying rules learned by a machine learning process to the geometric appearance of the one or more known features.

11. The method according to claim 7, wherein varying the model includes rotating the model about one or more rotational axes or translating the model in one or more linear dimensions.

12. The method according to claim 1, wherein the reference data includes a two dimensional image of the vehicle scene captured at an earlier time and at a known camera pose.

13. The method according to claim 12, wherein step d) includes performing an error minimization to align the one or more known features in a current image with corresponding one or more features in the earlier image and extracting the camera pose from the alignment.

14. The method according to claim 1, wherein the reference data includes camera orientation data received from an orientation sensor mounted to the camera.

15. The method according to claim 14, wherein the orientation data is compared to second orientation data received from an orientation sensor mounted to the vehicle frame.

16. A system configured to determine a pose of a camera that is positioned to capture an image of a vehicle scene, the system comprising:
    a camera mounted at a known position within or adjacent to the vehicle scene and positioned to image the interior of the vehicle;
    an orientation sensor mounted to the camera and configured to generate an orientation signal indicative of an orientation of the camera relative to a reference orientation;

a processor circuit operatively associated with the orientation sensor and configured to:
   receive the orientation signal;
      compare, based on the orientation signal, the orientation of the camera with a reference orientation of the camera relative to a frame of reference within the scene and to determine an orientation error based on the comparison; and
      update, based on the orientation error, a current orientation of the camera and to determine a new camera pose.

17. The system according to claim 16, wherein the reference orientation is defined by the geometry of the vehicle cabin.

18. The system according to claim 16, further comprising a sensor connected to the processor that is configured to receive velocity or acceleration data of the vehicle, wherein the velocity or acceleration data is used by the processor to augment the orientation signal for determining the orientation error.

19. The system according to claim 16, wherein calculation of the current orientation of the camera includes determining a differential or relative orientation between the camera and another camera or between the camera and an accelerometer on-board the vehicle.

20. A method of training a neural network to recognize a camera pose within a scene, the method including:
   a) generating a two dimensional image of the scene from a three dimensional model of the scene assuming a predetermined observation reference point;
   b) performing image analysis on the generated image to learn details of a geometric appearance of known features in the generated image;
   c) associating the learned details of the geometric appearance of the known features with a camera pose defined by the predetermined observation reference point;
   d) adjusting the predetermined observation reference point and repeating steps a) to c) a predetermined number of times; and
   e) learning rules or patterns associating the camera pose and the geometric appearance of the known features within the scene as viewed from different predetermined observation reference points.

* * * * *